Patented July 17, 1951

2,560,869

UNITED STATES PATENT OFFICE 2,560,869

CHLORINATION OF SYNTHETIC RUBBER

Joy G. Lichty, Stow, Ohio, assignor to Wingfoot Corporation, Akron, Ohio, a corporation of Delaware No Drawing. Application July 18, 1947,
Serial No. 762,007

6 Claims. (Cl. 260—85.1)

This invention relates to the chlorination of a rubbery copolymer of styrene and 1,3-butadiene in the presence of iodine.

Copolymers of styrene and 1,3-butadiene are difficult to chlorinate because the copolymer forms a gel at an early stage in the chlorination. When the copolymer is in the gel stage the rate of chlorination is so slow that it becomes impractical to continue the chlorination. The commercial uses of chlorinated rubbers require a viscosity of about 500 C. P. S. or less for a 20% solution in toluene at 25° C. At the present time a practical method commercially for the chlorination of copolymers of styrene and 1,3-butadiene has not been developed.

It has now been discovered that the use of iodine during the chlorination of the copolymer of styrene and 1,3-butadiene unexpectedly permits the production of a low viscosity product in a relatively short period of time.

The effect of the use of iodine in producing low viscosity chlorinated copolymers of styrene and 1,3-butadiene is shown in the following example:

A 5% solution in ethylene dichloride of a copolymer resulting from the polymerization of a mixture containing 75 parts of 1,3-butadiene and 25 parts of styrene was chlorinated for 3 hours in the presence of 3% iodine at a temperature of 50° C. The quenched chlorinated product gave a solution viscosity of 396 C. P. S. in a 20% solution of toluene at 25° C. The product had a halogen content of 53.2% calculated as chlorine. When the same 5% solution of the 1,3-butadiene-styrene copolymer in ethylene dichloride was chlorinated for 5 hours at 50° C. in the absence of iodine, the quenched product had a viscosity of 1800 C. P. S. and a chlorine content of 49.9%. Continued chlorination for a total of 19 hours gave a product with a viscosity of only 1000 C. P. S. Thus, in the absence of iodine the chlorination time was increased over 600%, yet the final product did not have the viscosity reduced to that obtained in the presence of iodine in the 3 hour period.

In addition to the reduction in time required to bring about the chlorination of the copolymer when chlorinating in the presence of iodine and in addition to the ability to reduce the viscosity of the chlorinated product in a relatively short period of time, it has also been observed that these results may be duplicated. For example, when the copolymer is chlorinated in the absence of iodine, the results may on one occasion show a gradual decrease in the viscosity of the chlorinated product as the chlorination is continued, while on another occasion under identical conditions of operation the results are very erratic. For example, even during the early stages of the chlorination the product will have a value entirely different from the value observed in the previous operation after the same period of chlorination has elapsed, and instead of the value gradually decreasing, will increase and then as the chlorination is continued, will decrease again to a value lower than the starting value. On the other hand, it has been observed that the same values of chlorination and viscosity and time periods may be repeated from batch to batch when the chlorination is carried out in the presence of iodine.

Thus it may be seen that a successful method has been discovered for the preparation of a low viscosity chlorinated copolymer of 1,3-butadiene and styrene, which method comprises the chlorination of the copolymer in the presence of iodine.

These desirable results are obained when the copolymer is chlorinated in solution. The same results may not be obtained when using the copolymer in latex form. It is necessary that the solution be formed in a particular solvent because all solvents will not produce the desired result. For example, it has been observed that carbon tetrachloride will not function as a suitable solvent. When carbon tetrachloride is used as the solvent, the copolymer to be chlorinated begins to precipitate from solution as soon as the chlorination is started. Even continued chlorination of this precipitated mass for a number of hours fails to resolubulize the precipitate. However, it has been observed that chloroform functions as a successful solvent. The preferred solvent, however, is ethylene dichloride. Other solvents that may be used include 1,1,2-trichloroethane; 1,1,1,2-tetrachloroethane; 1,1,2,2-tetrachloroethane; benzene; and monochloro benzene.

Another example of carrying out the present invention is to dissolve a copolymer resulting from the polymerization of 75 parts of 1,3-butadiene and 25 parts of styrene (with an intrinsic viscosity of 1.09 in benzene at 25° C.) in ethylene dichloride to give a 5% solution. The copolymer is obtained by removing the latex from the polymerization kettle before the polymerization is 60% completed. The latex is then coagulated from solution and the coagulant dissolved in ethylene dichloride. Iodine in the amount of 3% on the rubber was added to the cement and stirred into solution. Chlorine was introduced into this 5% cement in the presence of difused light at a temperature of 50° C. while the cement was continually stirred. The chlorine was passed into the system at such a rate that chlorine was present in the exit gases. The chlorine was consumed rapidly by the cement at the beginning of the reaction; then the reaction rate dropped off slowly, thereby requiring a slower flow of chlorine into the reaction chamber. The chlorination was continued for 3 hours, after which time the reaction product was quenched by adding slowly to gasoline with vigorous stirring. A chlorinated product was produced having a chlorine content of 53.2% and a viscosity of 396 C. P. S.

The amount of iodine that may be added to the cement may vary from about 1.0% to about 3%. The effect of a catalyst may be noted with a greater or lesser amount of iodine. However, at least 1% of iodine is usually required to obtain a maximum effect. The iodine is added as crystals to the cement and the cement is stirred until the iodine crystals have been dissolved.

Any copolymer of 1,3-butadiene and styrene in which the ratio of butadiene to styrene may vary from 60/40 to 90/10 may be chlorinated according to the present invention. The selection of the ratio depends upon the use to which the end product is to be put. For example, when the end product is to be used as a coating composition for fabrics, it is generally preferred to use a copolymer resulting from the polymerization of a mixture of 75 parts of butadiene and 25 parts of styrene. The chlorinated products of this invention may also be used as the film-forming ingredients in paint formulations.

Suitable changes may be made in the details of the process without departing from the spirit or scope of the present invention, the limitations of which are defined in the appended claims.

I claim:

1. The method of chlorinating a rubbery copolymer of styrene and 1,3-butadiene which comprises chlorinating the copolymer in a solvent selected from the group consisting of 1,2-dichloroethane, 1,1,2-trichloroethane, 1,1,1,2-tetrachloroethane, 1,1,2,2,-tetrachloroethane, chloroform, benzene and monochlorobenzene, in the presence of 1% to 3% of iodine to a chlorine content of at least 53% within 3 hours.

2. The process of chlorinating a rubbery copolymer of styrene and 1,3-butadiene which comprises chlorinating the copolymer in a solution of 1,2-dichloroethane in the presence of 1% to 3% of iodine to a chlorine content of at least 53% within 3 hours.

3. The method of chlorinating a copolymer resulting from the polymerization of a mixture comprising 75 parts of 1,3-butadiene and 25 parts of styrene which comprises chlorinating the copolymer in a solvent selected from the group consisting of 1,2-dichloroethane, 1,1,2-trichloroethane, 1,1,1,2-tetrachloroethane, 1,1,2,2-tetrachloroethane, chloroform, benzene and monochlorobenzene, in the presence of 1% to 3% of iodine to a chlorine content of at least 53% within 3 hours.

4. The method of chlorinating a copolymer resulting from the polymerization of a mixture comprising 75 parts of 1,3-butadiene and 25 parts of styrene which comprises chlorinating the copolymer in a solution of 1,2-dichloroethane in the presence of 1% to 3% of iodine to a chlorine content of at least 53% within 3 hours.

5. The method of chlorinating a rubbery copolymer of styrene and 1,3-butadiene which comprises chlorinating the copolymer in a solvent selected from the group consisting of 1,2-dichloroethane, 1,1,2-trichloroethane, 1,1,1,2-tetrachloroethane, 1,1,2,2-tetrachloroethane, chloroform, benzene and monochlorobenzene, in the presence of 1% to 3% of iodine at 50° C. to a chlorine content of at least 53% within 3 hours.

6. The method of chlorinating a rubbery copolymer of styrene and 1,3-butadiene which comprises chlorinating a 5% solution of the copolymer in ethylene dichloride in the presence of 3% of iodine at 50° C. for three hours.

JOY G. LICHTY.

REFERENCES CITED

The following references are of record in the file of this patent:

UNITED STATES PATENTS

| Number | Name | Date |
|---|---|---|
| 1,544,534 | Ellis | June 30, 1925 |
| 2,292,737 | Blomer | Aug. 11, 1942 |
| 2,470,952 | Remy | May 24, 1949 |

OTHER REFERENCES

Groggins, "Unit Processes In Organic Synthesis," pages 207–8 2d. Ed., McGraw Hill (1938).

"Soviet Russia," India Rubber World, pps. 74 and 76 (April 1943).